United States Patent Office 3,155,325
Patented Nov. 3, 1964

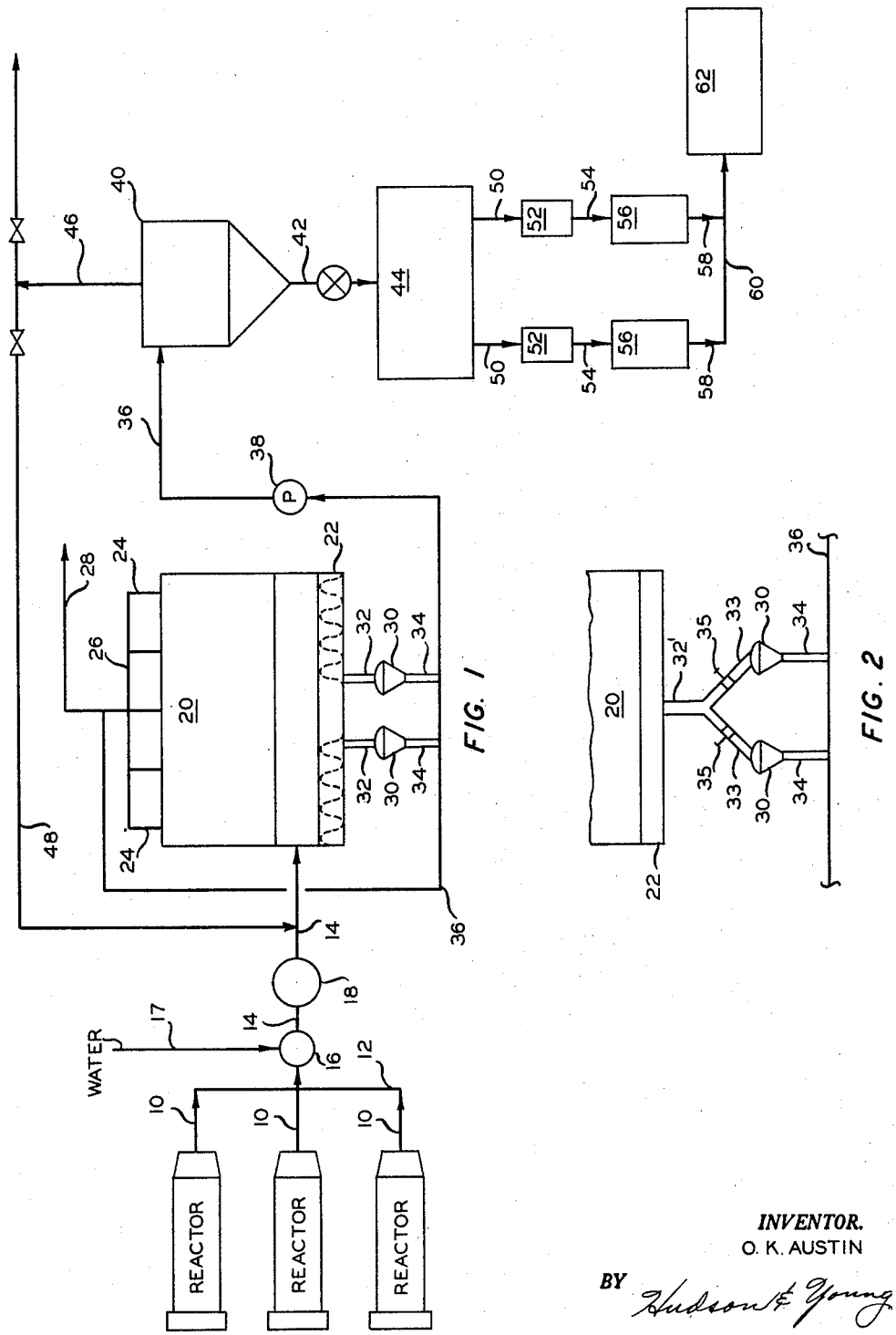

3,155,325
PROCESS AND APPARATUS FOR TREATING
CARBON BLACK EFFLUENT
Oliver K. Austin, Bartlesville, Okla., assignor to Phillips
Petroleum Company, a corporation of Delaware
Filed Oct. 14, 1960, Ser. No. 62,708
10 Claims. (Cl. 241—18)

This invention relates to a process and apparatus for producing, handling, and treating a carbon black stream.

In the production of carbon black, such as furnace black, the effluent gas from a series of carbon black furnaces is passed thru a collecting system including cyclone separators, bag filters, micropulverizers, conveyors, and other equipment to pellet mills which pellet the black to compact the same and to facilitate handling of the product. One of the important steps in the recovery and treatment process prior to the pelleting step involves pulverizing the recovered black so as to break up particles thereof which are unduly large for proper handling and pelleting. This step is accompished or performed by conventional micropulverizers which comprise rotating blades for driving the black thru screens on its way thru the pulverizer.

In a common arrangement of apparatus, as illustrated in U.S. patent to Bethea et al. 2,717,658, the micropulverizer is positioned just upstream of a screw conveyor which feeds the black into a pellet mill or into shipping facilities. With this arrangement the micropulverizer delivers the pulverized black in admixture with a substantial amount of gas to a screw conveyor. This requires taking this gas off the conveyor and passing same thru a special filter in order to prevent economic loss and to prevent a dirty condition in the plant. The present invention has been devised to eliminate this problem and to effect certain other advantages pointed out hereinbelow.

Accordingly, it is an object of the invention to provide an improved process and arrangement of apparatus in a carbon black plant. Another object is to reduce loss of carbon black to the atmosphere and improved the recovery of black. A further object is to effect better utilization of effluent reactor gas in handling the recovered carbon black in a carbon black process. It is also an object to reduce required filter bag capacity in a carbon black plant. Other objects of the invention will become apparent upon consideration of the accompanying disclosure.

A broad aspect of the invention comprises passing recovered carbon black directly from a bag filter in a carbon black recovery apparatus or process to one or more micropulverizers which then feed directly into a pneumatic conveyor line leading to a black separator which in turn delivers the black to suitable disposal, such as to a surge vessel feeding a series of pellet mills. The micropulverizers take gas as well as carbon black from the bottom of the bag filter and deliver the black in suspension into a pneumatic conveyor line, thereby not only not requiring filtering of the gas taken from the micropulverizers but actually taking advantage of the presence of black in the conveyor gas.

A further embodiment of the invention comprises taking the major portion of the conveyor gas for the pneumatic conveyor from the bag filter. The conveyor gas is taken from the clean off-gas line or stack from the bag filter. Most of the conveyor gas is taken directly from the stack of the bag filter with a minor portion thereof being taken from the lower section of the filter thru the micropulverizer(s). A further refinement of the invention comprises passing off-gas from the downstream separator (at the delivery end of the pneumatic conveyor) to the feed inlet of the bag filter for recovery of residual carbon black from this stream.

A more complete understanding of the invention may be had by reference to the accompanying schematic drawing of which FIGURE 1 is a flow or arrangement of apparatus in a carbon black plant, and FIGURE 2 is a fragmentary view of an alternative arrangement of micropulverizers in relation to the bag filter and pneumatic line of FIGURE 1.

Referring to FIGURE 1, a series of reactors or furnaces R designed to produce furnace or carbon black are provided with effluent smoke lines 10 which feed into a common header 12 and into an effluent line 14. A water quench tank 16, provided with water line 17, is positioned in line 14 to reduce the temperature of the black before passing the same into bag filter 20. An agglomerator 18 is positioned in line 14 downstream of quench tank 16 to effect partial agglomeration of the black. Bag filter 20 is a conventional bag filter such as that of U.S. Patent 2,805,732 of Martines or of U.S. Patent 2,871,978 to Webster et al. In bag filter 20, the carbon black-laden smoke passes into a large number of filter bags hanging suspended from their closed ends so that the black is retained on the inside walls of the bags. The bags are periodically shaken and back pressured so that the black drops down into the bottom of the apparatus where it is augured from both ends to the middle of conveyor 22. The gas passing thru the bags is relatively clean and is vented thru individual stacks 24 from the several compartments of the filter and thence thru header 26 into stack 28.

Micropulverizers 30 are positioned just below the inner ends of the augurs in conveyor 22 to which they are connected by unobstructed conduits 32. The micropulverizers feed the pulverized black directly into unobstructed conduits 34 which deliver the black in suspension in gas taken from the lower section of filter 20 to pneumatic conveyor line 36. In a preferred arrangement, conveyor line 36 connects with stack 28 and blower 38 is positioned in this conveyor downstream of the micropulverizers so as to take gas from both the stack and the lower section of the bag filter thru the micropulverizers.

The suspension of carbon black is passed from pneumatic conveyor 36 into a suitable separator 40, such as a cyclone separator, which delivers the recovered black thru line 42 to a surge tank or vessel 44. Off-gas from separator 40 is preferably passed thru lines 46 and 48 to the feed inlet to the bag filter 20 as thru line 14 just upstream of the filter.

Carbon black is passed from surge vessel 44 thru lines 50 to wet pellet mills 52 for conventional wet pelleting from which the wet pellets are passed thru lines 54 to drier 56. The dry pellets are then passed thru lines 58 to a conveyor 60 for transport to storage or transportation facility 62.

Referring to FIGURE 2, a single outlet conduit 32 connects with the bottom of conveyor 22 of bag filter 20 and feeds into individual conduits 33 which are provided with slide valves 35 for shutting off the flow in either conduit. Conduits 32 of FIGURE 1 can also be provided with slide valves so that either pulverizer may be readily taken out of service for repair. The apparatus arrangement is otherwise the same as that shown in FIGURE 1.

In plant operation utilizing 12" I.D. tangential carbon black reactors converting oil to carbon black and utilizing a pair of micropulverizers connected in an apparatus arrangement as shown in FIGURE 1, a blower in the pneumatic conveyor line pulling 2,000 s.c.f.m. (standard cubic feet per minute) draws approximately 1400 s.c.f.m. from stack 28 and about 600 s.c.f.m. from the lower section of the bag filter thru the micropulverizers. The plant produces approximately 180,000 pounds of black per day, two-thirds of which is recovered thru a bag filter having nine compartments (eight in operation while one is being back pressured). The remaining one-third is recovered in a bag filter of five compartments, four of which are continuously in service.

The positioning of the micropulverizers between the bag filter and the pneumatic conveyor so as to pull gas from the lower section of the bag filter not only avoids the necessity of installing a filter as pointed out hereinbefore, but also draws a substantial amount of unfiltered gas from the lower section of the bag filter which does not require filtering before passing same to the pneumatic conveyor and yet passes the black thru the micropulverizers so as to avoid passing grit into the final product. The use of open, unobstructed conduits 32 and 34 is essential to the invention. This feature of the invention greatly reduces the bag filter capacity required for a given size carbon black plant.

Certain modifications of the invention will become apparent to those skilled in the art and the illustrative details disclosed are not to be construed as imposing unnecessary limitations on the invention.

I claim:

1. A process for recovering carbon black from a stream of smoke containing same which comprises passing said stream into a lower compartment of a bag filter and upwardly thru filter bags into an upper separate compartment of said filter so as to filter black from said stream, drop the black to the bottom of said lower compartment, and pass relatively clean gas from said upper compartment; gravitating separated black from the bottom of said lower compartment into a micropulverizer while pulling smoke therewith from said lower compartment; comminuting coarse black particles and forming a suspension of black in said smoke in said micropulverizer; passing said suspension into a pneumatic conveyor line carrying a conveyor gas; and conveying said black suspension thru said conveyor line to a gas-black separation zone to recover black from said gas.

2. The process of claim 1 including the step of passing relatively clean off-gas from said upper compartment of said bag filter thru said conveyor line as the principal conveyor gas.

3. The process of claim 2 wherein at least one-fourth but less than one-half of the conveyor gas in said conveyor line is taken from said lower compartment of said filter with said black.

4. The process of claim 2 including the step of passing off-gas from said separation zone to the smoke inlet of said bag filter to recover residual black therefrom.

5. In a carbon black plant, a carbon black recovery system comprising in combination a bag filter for separating black and gas from a carbon black stream and venting gas from an upper compartment and depositing black in a lower compartment; an outlet in the bottom of said lower compartment for removing carbon black; a pneumatic conveyor line subjacent said lower compartment connected with a gas supply and with a gas-solids separator for transporting black received from said outlet conduit to said separator; a conduit connecting said outlet with said conveyor line having a micropulverizer therein but otherwise being open and unobstructed; means for feeding black and unfiltered gas thru said outlet into said conduit to said micropulverizer, whereby carbon black and unfiltered gas pass into said conveyor line thereby eliminating necessity for filtering the gas passed to said micropulverizer.

6. The system of claim 5 wherein said pneumatic conveyor is connected to receive effluent gas from said bag filter as conveyor gas.

7. The system of claim 5 wherein said separator comprises a cyclone separator and the gas outlet therefrom is connected by conduit with the inlet to said bag filter.

8. In combination, a bag filter adapted to remove carbon black from a smoke stream containing same, said filter having an inlet for smoke in a lower compartment, an outlet for black in the bottom of said lower compartment, filtering means in an upper compartment for dumping black into said lower compartment, means for feeding black into said outlet, and an effluent gas line from said upper compartment; a micropulverizer connected by an open, unobstructed conduit with said outlet to receive black and smoke from said lower compartment; and a pneumatic conveyor line connected by an open, unobstructed conduit with said micropulverizer to receive carbon black and smoke therefrom.

9. The combination of claim 8 wherein said pneumatic conveyor line is connected to pick up carrier gas from said effluent gas line; and including a blower in said conveyor line downstream of said micropulverizer.

10. The combination of claim 9 including a second micropulverizer connected by unobstructed conduits with a second outlet for black in said filter and with said conveyor line for parallel flow with first said micropulverizer.

References Cited in the file of this patent

UNITED STATES PATENTS

| 2,788,267 | Larson et al. | Apr. 9, 1957 |
| 2,917,374 | Wood | Dec. 15, 1959 |

FOREIGN PATENTS

| 742,187 | Great Britain | Dec. 21, 1955 |